July 8, 1930.  A. B. SAURMAN ET AL  1,769,967
JOINT STRUCTURE FOR ELECTRICAL CONDUCTORS
Filed Feb. 10, 1926
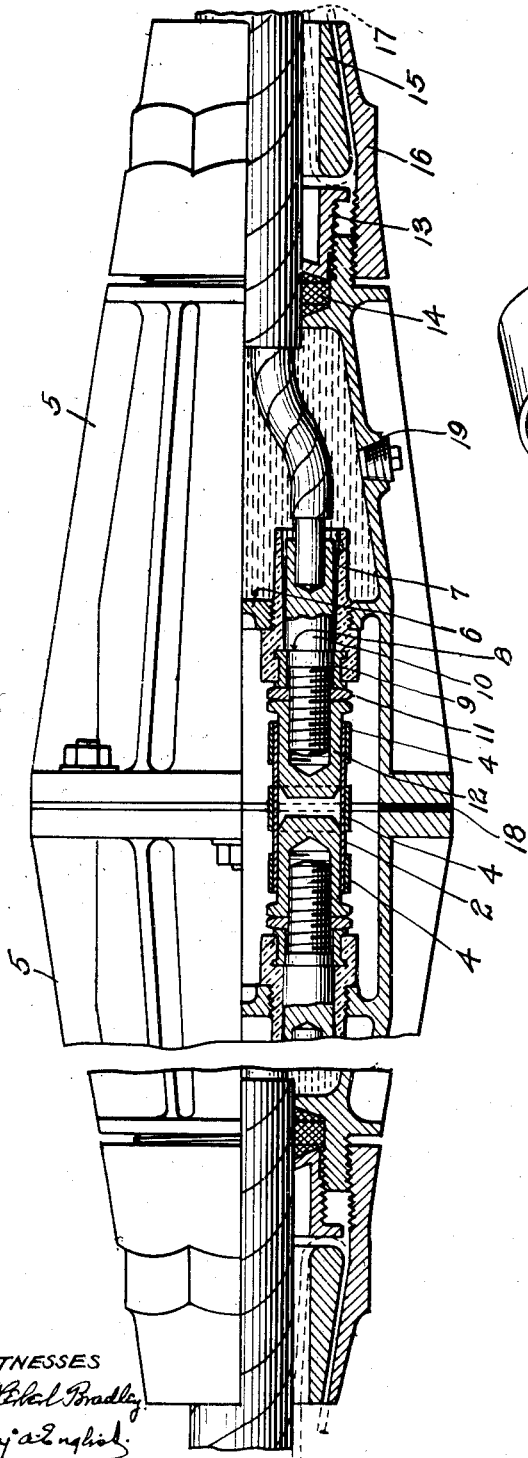
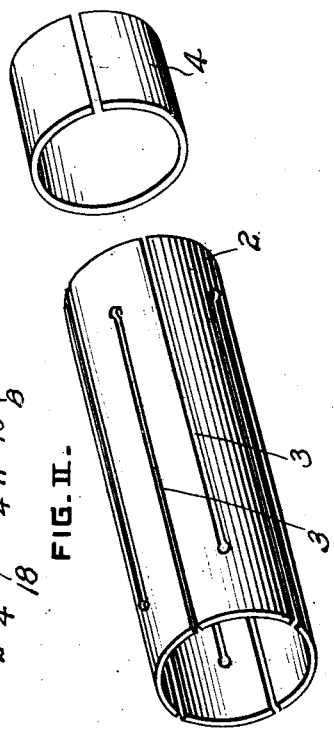
INVENTOR
Atlee B. Saurman
John B. Webb
Leon D. Beach
by Christy and Christy
their attorneys
WITNESSES

Patented July 8, 1930

1,769,967

UNITED STATES PATENT OFFICE

ATLEE B. SAURMAN, OF PITTSBURGH, AND JOHN B. WEBB, OF WILKINSBURG, PENNSYLVANIA, AND LEON D. BEACH, OF LONGVIEW, WASHINGTON, ASSIGNORS, BY MESNE ASSIGNMENTS, TO GENERAL CABLE CORPORATION, A CORPORATION OF NEW JERSEY

JOINT STRUCTURE FOR ELECTRICAL CONDUCTORS

Application filed February 10, 1926. Serial No. 87,301.

Our invention relates to the jointing of electric cables, and consists in a two-part joint structure which being built, one part upon each of the two cable-ends to be united, may be united and separated at will. When united, the joint structure affords secure mechanical union and adequate electrical union between successive lengths of cable. While not limited in applicability to electric cables of any particular class, we have developed it in application to cables such as are used in temporary installations and which are taken up and laid again repeatedly. Cables for such use, as distinguished from cables of relatively permanent installation, are not ordinarily lead-sheathed; they ordinarily are armored with an external wrapping of steel wire; they are relatively flexible; and the conditions of their service require a joint which may be quickly made and broken and made again.

In the accompanying drawings Fig. I is a view partly in side elevation partly in medial and longitudinal section of a joint structure of the invention; Fig. II is a view in perspective and to somewhat larger scale of the member, detached, through which electrical union is effected.

The uniting member separately shown in Fig. II consists of a cylindrical sleeve 2 of conducting material, ordinarily of copper, slitted from opposite ends in slits 3 which overlap or interdigitate. The number of slits may vary; Fig. II indicates eight such slits, equally spaced, and extending, four from each end, and extending each to proximity to the remote end of the sleeve. That is an adequate number of slits, adequately proportioned and arranged.

Combined with the sleeve, constriction members may and preferably will be provided. These may conveniently take the form of split rings 4 of resilient material. One such ring is shown in Fig. II, separate from but in axial alignment with the sleeve 2, to which it is to be applied. In Fig. I the sleeve 2 is shown to be surrounded by three such constriction members 4, arranged, one at either end, and one in the middle. Each is a split ring of resilient material, it may be of bronze, and each when applied is effective yieldingly to resist diametrical expansion of the sleeve, and to constrict the sleeve into closer contact upon the body which, introduced within the sleeve, has effected expansion.

The ends of the conductors to be joined are shaped to the form of cylindrical plugs, preferably with bluntly tapered points, and of a diameter not less and preferably somewhat greater than the normal interior diameter of the uniting member. Electrical union is effected by driving the two plugs into the opposite open ends of the uniting member. The union, it will be observed, is a push-and-pull union, to be made and broken and made again at will.

Ordinarily in contact devices of this general sort, a plug of approximately cylindrical shape, though tapered somewhat, is introduced between oppositely yielding plates. The difficulty hitherto has been to get large areas of contact. The parts come to surface-to-surface contact only when the plug has been thrust home; in intermediate positions, contact is along lines or at least over narrowly restricted areas. With the contact device of this invention, there is full surface-to-surface contact over all the overlapping areas; to whatever degree the plugs be thrust home in the uniting member. When the plug is introduced, the sleeve expands, and whether the plug be driven into the sleeve a small distance, or to the full extent, the interior surface of the sleeve will extend in parallelism to the exterior surface of the plug, and there will be contact over all the overlapping areas.

Fig. I shows the structure which, carrying the electrical union now described, effects mechanical union of the cable-ends, the union being one which, as has already been said, may be made and broken quickly.

The joint-casing consists of two duplicate conical parts 5, formed ordinarily of iron or of bronze, adapted to be bolted base to base, in the position shown in Fig. I, and to be separated again by release of the bolts. Each conical half casing is truncated at the apex, and the axial opening so formed is adapted to receive an introduced cable-end. The means for effecting mechanical union of the casing upon the cable body at its entrance through this axial opening will presently be described.

The space within each conical casing part is divided by a transverse partition 6. Through this partition an orifice or orifices are formed, in such number as in the particular instance is required. The cable which we have chosen for purposes of illustration is a multiple-conductor cable, and accordingly, the drawing indicates an orifice which will be understood to be one of a number of such orifices. Each orifice carries a bushing 7, formed essentially of insulating material. The bore through the bushing is shouldered, as indicated at 8. The shoulder may conveniently be formed, as the drawing shows, by a brass ferrule 9, of somewhat smaller internal diameter, upon which and integrated with which the bushing 7 is shaped and hardened.

A conducting stem 10, socketed to receive the end of a cable conductor, and externally shouldered, is introduced in the bushing 7 and brought to shoulder-to-shoulder abutment with the bushing, and is secured by lock-nut 11 and cap-nut 12, screwed to place upon its protruding end. Although the drawing does not particularly show it, it will be understood that lock-nut and cap-nut may engage the stem by oppositely directed screw-threads, and thus the lock may be made the more secure. The cap-nut 12 constitutes the plug, for insertion in the coupling sleeve 2, already described. It will be perceived that, by proper proportioning of parts, the outer end of the cap-nut 12 falls a little short of the basal plane of the conical case-half 5.

Moisture-tight engagement of the remote end of each casing-half upon the outer surface of the cable-body is effected by means of a nut 13 threaded in the apical orifice in the conical casing-half. This nut 13, when applied, compresses between properly disposed surfaces and upon the surface of an introduced cable, a body 14 of packing material.

We preferably do not rely upon the union last described, to sustain tensile strains which an installed cable may have to endure, but provide an additional means for sustaining and distributing such strains. Two rings 15 and 16 surround the cable adjacent the end of the joint casing. Ring 15 is of suitable internal diameter to surround the armored cable; it is adapted to abut upon the end of the casing, and it is tapered externally diminishing in diameter from the end which abuts upon the joint casing outwardly, as clearly appears in Fig. I. Ring 16 is screw-threaded upon the end of the joint casing, it surrounds ring 15 and presents to the tapered outer surface of ring 15 an oppositely tapered inner surface.

Each half joint is separately mounted upon a cable end in the following manner. Ring 16, ring 15, and nut 13 are first slipped over the cable-end. The cable-end is prepared by cutting away its protecting envelopes and exposing its conductor or conductors. Upon each conductor a stem 10 is sweated. The properly prepared cable-end is now introduced through the apical orifice in the casing-half 5; if it be a multiple-conductor cable, the conductors are spread within the casing, and the stems 10 are passed through the bushings 7 previously secured in the orifices in partition 6; and the locking nuts 11 and the cap nuts 12 are then applied. When this has been done, packing 14 is applied, the nut 13 is advanced, and, the armor wires being removed, fluid-tight union is effected of the casing at its apical end upon the outer surface of the cable. When this has been done the chamber formed by the partition 6 at the apical end of the half casing, and now by the assembly closed at every orifice, may be filled with insulating compound, filling holes with removable closures 19 being provided for that purpose.

One of the armor wires is indicated in dotted lines at 17. It will be understood that these wires are wrapped helically but with long lay externally upon the cable body. The ends of these wires are raised to allow nut 13 to be applied. When the nut 13 has been applied to complete fluid-tight union of the half casing to the cable, ring 15 is advanced and caused to abut upon the end of the nut 13, with the armor wires between, and the ends of the armor wires are then bent back over the outer and tapered surface of ring 15. Ring 16 is then advanced and screwed home upon the end of the casing, and as it comes to place it clamps the ends of armor wires between itself and ring 15. The anchorage thus accomplished of the armor wires is adequate to take all tensile strain, relieving the other parts in that respect.

The structure is then ready for union, and all that is needed is to bring two such conical joint-halves, borne by the cable-ends to be united, into base-to-base engagement; to thrust the opposite cap-nuts 12 home within sleeves 2; and to bolt the joint-halves together, with packing 18 between the meeting rims. A tight joint is thus formed, and each half of the structure is closure for the other.

The halves may be united and separated at will, and the electrical union made and broken at will. No rebuilding of joint structure is involved in re-establishing electrical union. The union when made is adequate, both electrically and mechanically, for temporary or for continuing use, in "portable" service or in permanent installation.

The conical shape permits free movement of the joint structure, a very desirable feature in "portable" service. The anchorage of the cable armor to the joint casing effects a "bridging" by tension-sustaining parts, over and around the sealed electrical union, and this gives security and undiminished efficiency under severe conditions of service.

We claim as our invention:

1. A push-and-pull coupling for electrical conductors including a sleeve of conducting material slit longitudinally from opposite ends by interdigitated slits and encircled by a resilient constricting member.

2. A joint structure for electric cables including two case parts adapted to be brought together and to form each a closure for the other, each case part carrying a plug of conducting material, each case part adapted to receive and carry a cable end with the aforesaid plug in electrical union with the cable conductor, and an expansible sleeve of conducting material adapted to receive in its opposite ends the plugs of two case parts and to be so engaged by the plugs of two case parts when the parts are brought together.

3. A joint structure for electric cables including two conical case parts adapted to be united base to base, each case part being provided with an apical cable receiving opening and means for clamping a cable to place within the opening, each case part being further provided interiorly with a transerve partition with orifices in the partition, bushings of insulating material set in said orifices, stems of conducting material adapted to be united electrically to cable conductors and adapted to be clamped to place in said bushings, clamping nuts adapted to engage said stems, and expansible sleeves of conducting material adapted to be engaged by and to unite opposite clamping nuts.

4. A make-and-break joint structure for a flexible armored cable including two conical half casings adapted to be united in base-to-base engagement, each casing half provided with an apical orifice and internally with a transeverse and orificed partition, means for securing in fluid-tight engagement in the orifice of each casing half an unarmored cable body, means for anchoring to each casing half the end of the armor of a length of cable whose body is introduced through such orifice, a conducting stem for each casing half adapted to be united to the end of a cable conductor and adapted to be secured in the orifices in the said partitions, and an expansible sleeve adapted to be engaged by and to complete the electrical union of opposite conducting stems borne by companion casing halves.

In testimony whereof we have hereunto set our hands.

ATLEE B. SAURMAN.
JOHN B. WEBB.

In testimony whereof I have hereunto set my hand.

LEON D. BEACH.